(12) United States Patent
Zhuge et al.

(10) Patent No.: US 10,236,982 B1
(45) Date of Patent: Mar. 19, 2019

(54) FIBER PARAMETER IDENTIFICATION

(71) Applicants: Qunbi Zhuge, Ottawa (CA); Maurice O'Sullivan, Ottawa (CA)

(72) Inventors: Qunbi Zhuge, Ottawa (CA); Maurice O'Sullivan, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 15/849,940

(22) Filed: Dec. 21, 2017

(51) Int. Cl.

| | |
|---|---|
| *H04B 10/073* | (2013.01) |
| *H04B 10/2513* | (2013.01) |
| *H04B 10/2543* | (2013.01) |
| *H04B 10/079* | (2013.01) |
| *H04B 10/077* | (2013.01) |
| *G06F 15/18* | (2006.01) |
| *G06N 20/00* | (2019.01) |

(52) U.S. Cl.
CPC ....... *H04B 10/2513* (2013.01); *H04B 10/073* (2013.01); *H04B 10/0731* (2013.01); *H04B 10/0775* (2013.01); *H04B 10/07953* (2013.01); *H04B 10/2543* (2013.01); *G06F 15/18* (2013.01); *G06N 20/00* (2019.01); *H04B 2210/252* (2013.01); *H04B 2210/254* (2013.01)

(58) Field of Classification Search
CPC .................................... H04B 10/07–10/0799
USPC ................................................... 398/25–38
See application file for complete search history.

(56) References Cited

U.S. PATENT DOCUMENTS

| | | | | |
|---|---|---|---|---|
| 6,965,736 | B1* | 11/2005 | Hanik | H04B 10/07953 398/14 |
| 7,957,641 | B2* | 6/2011 | Boertjes | H04B 10/07955 398/208 |
| 8,095,342 | B2* | 1/2012 | Grigoryan | G06F 17/504 703/2 |
| 8,787,754 | B1* | 7/2014 | Beckett | H04B 10/0793 398/147 |
| 9,319,137 | B2* | 4/2016 | Zhuge | H04B 10/2543 |
| 9,485,019 | B1* | 11/2016 | Kim | H04B 10/07955 |

(Continued)

OTHER PUBLICATIONS

Pending U.S. Appl. No. 15/461,718, filed Mar. 17, 2017.
Pending U.S. Appl. No. 15/828,497, filed Dec 1, 2017.

*Primary Examiner* — Li Liu
(74) *Attorney, Agent, or Firm* — Integral Intellectual Property Inc.; Amy Scouten; Miriam Paton

(57) ABSTRACT

Technology for fiber parameter identification in an optical communications network is described. One or more C-matrices are calculated from one or more corresponding signals received at a receiver from a transmitter over a link in the optical communications network, where each C-matrix comprises a plurality of C-coefficients representative of nonlinear noise in the received signal. A combination of chromatic dispersion (CD) pre-compensation applied at the transmitter and CD post-compensation applied at the receiver may substantially compensate for a net CD of the link. The one or more C-matrices are used to identify one or more fiber parameter estimates of the link, such as one or more fiber types, one or more nonlinear coefficients, or one or more dispersion coefficients. A controller of the optical communications network may use the identified fiber parameters estimates to control a state of the network to achieve an objective, such as improved network performance.

20 Claims, 6 Drawing Sheets

(56) References Cited

U.S. PATENT DOCUMENTS

| | | | |
|---|---|---|---|
| 2004/0105682 A1* | 6/2004 | Roberts | H04B 10/25137 398/147 |
| 2004/0165886 A1* | 8/2004 | Barwicz | H04B 10/07953 398/33 |
| 2004/0197103 A1* | 10/2004 | Roberts | H04B 10/2543 398/159 |
| 2004/0208605 A1* | 10/2004 | Bakhshi | H04B 10/2513 398/147 |
| 2009/0214201 A1* | 8/2009 | Oda | H04B 10/0795 398/25 |
| 2009/0214215 A1* | 8/2009 | Li | H04B 10/2507 398/81 |
| 2010/0239254 A1* | 9/2010 | Li | H04B 10/2507 398/65 |
| 2010/0239261 A1* | 9/2010 | Li | H04B 10/2507 398/81 |
| 2010/0239262 A1* | 9/2010 | Li | H04B 10/2507 398/81 |
| 2010/0239270 A1* | 9/2010 | Li | H04B 10/2507 398/208 |
| 2011/0053528 A1* | 3/2011 | Cunningham | H04B 3/46 455/114.2 |
| 2012/0219303 A1* | 8/2012 | Li | H04B 10/25133 398/208 |
| 2014/0140693 A1* | 5/2014 | Mikhailov | H04B 10/0775 398/29 |
| 2015/0010300 A1* | 1/2015 | Fan | H04B 10/0731 398/29 |
| 2015/0071630 A1* | 3/2015 | Oyama | H04B 10/6163 398/25 |
| 2015/0071652 A1* | 3/2015 | Zhuge | H04B 10/516 398/158 |
| 2015/0104189 A1* | 4/2015 | Fan | H04B 10/2557 398/147 |
| 2015/0295643 A1* | 10/2015 | Zhao | H04B 10/0795 398/29 |
| 2018/0234184 A1* | 8/2018 | Tanimura | H04B 10/2513 |

\* cited by examiner

FIBER PARAMETER IDENTIFICATION

TECHNICAL FIELD

This document relates to the technical field of optical communications.

BACKGROUND

An optical communications system or network may comprise one or more links, where a given link connects a transmitter to a receiver by one or more optical fibers. Each link may comprise one or more spans, where a given span comprises a length of fiber and one or more optical amplifiers used to compensate for the attenuation loss in that span.

As a result of chromatic dispersion (CD), an input signal may broaden as it travels down a length of fiber. The net CD of a link may be compensated for using pre-compensation at the transmitter, or post-compensation at the receiver, or some combination thereof. Different fiber types may have different CD characteristics.

SUMMARY

According to a broad aspect, technology for fiber parameter identification in an optical communications system or network is described. One or more C-matrices are calculated from one or more corresponding signals received at a receiver from a transmitter over a link in the optical communications system, where each C-matrix comprises a plurality of C-coefficients representative of nonlinear noise in the received signal. The one or more C-matrices are used to identify one or more fiber parameter estimates of the link, such as one or more fiber types, one or more nonlinear coefficients, or one or more dispersion coefficients.

According to some examples, a combination of chromatic dispersion (CD) pre-compensation applied at the transmitter and CD post-compensation applied at the receiver substantially compensates for a net CD of the link.

According to some examples, a plurality of C-matrices are calculated from a corresponding plurality of received signals, and for each received signal, a different amount of CD post-compensation is applied at the receiver.

According to some examples, one or more fiber parameter estimates of the link are identified by applying a machine learning algorithm to the C-coefficients and to one or more known parameters of the link, such as the net CD of the link, a length of the link, and a launch power of each span in the link.

According to some examples, the machine learning algorithm comprises one or more trained artificial neural networks (ANNs).

According to another broad aspect, an optical communications system or network may comprise at least one link comprising one or more optically amplified spans, and at least one electronic device configured to calculate one or more C-matrices from one or more corresponding signals received over a particular link of the at least one link, where each C-matrix comprises a plurality of C-coefficients representative of nonlinear noise in the received signal. The at least one electronic device may be further configured to identify one or more fiber parameter estimates of the particular link based on the one or more C-matrices. The network further comprises a controller configured to use the identified fiber parameter estimates to control a state of the network to achieve an objective, such as improved network performance.

According to some examples, a combination of CD pre-compensation applied at a transmitter of the particular link and CD post-compensation applied at a receiver of the particular link substantially compensates for a net CD of the particular link.

According to some examples, the at least one link may comprise a first link and a second link, where the first link and the second link share a common span. The at least one electronic device may comprise a first electronic device and a second electronic device, and the controller device may be configured to combine a first fiber parameter estimate identified by the first electronic device and associated with the common span, with a second fiber parameter estimate identified by the second electronic device and associated with the common span, to generate an improved fiber parameter estimate for the common span.

According to some examples, the controller device may be configured to combine the one or more fiber parameter estimates identified by the at least one electronic device with fiber parameter measurements obtained by other means to generate one or more improved fiber parameter estimates for the particular link.

DETAILED DESCRIPTION

Figure 1:
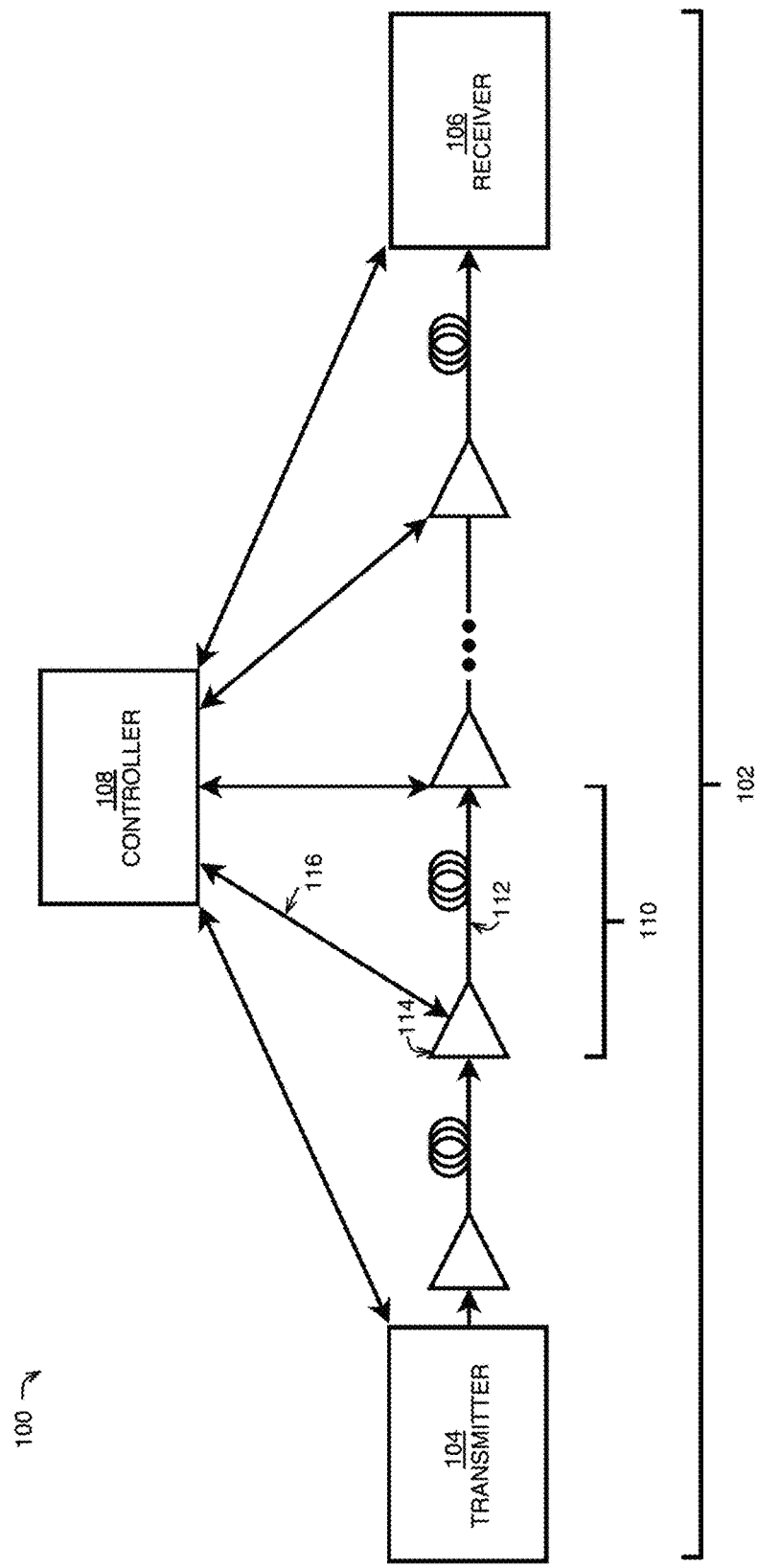
FIG. 1 illustrates an example optical communications system in accordance with examples of the fiber parameter identification technology disclosed herein.

FIG. 1 illustrates an example optical communications system in accordance with examples of the fiber parameter identification technology disclosed herein.

An optical communications system or network 100 may include one or more links, such as a link 102 between a transmitter 104 and a receiver 106. One or both of the transmitter 104 and receiver 106 may operate as a transceiver capable of transmitting and receiving signals. One or both of the transmitter 104 and the receiver 106 may comprise a coherent modem.

Each link in the communications system 100 may comprise one or more spans, where a span may comprise a length of optical fiber and one or more optical amplifiers, such as erbium-doped fiber amplifiers (EDFAs), multi-stage EDFAs, hybrid EDFA/Raman amplifiers, and the like. For example, the link 102 comprises the span 110, which comprises an optical amplifier 114 and a length of fiber 112. The optical amplifier 114 may be used to compensate for the attenuation loss in the length of fiber 112.

Each span, such as the span 110, may comprise one or more fiber types. Examples of fiber types include Non-Dispersion-Shifted Fiber (NSDF), Large Effective Area Fiber (LEAF), Enhanced Large Effective Area Fiber (EL-EAF), TrueWave Classic (TWC), Lambda Shifted (LS), TrueWave Reduced Slope (TWRS), and the like. The amount of attenuation loss in a length of fiber may depend on the fiber type(s) that make up that length.

Accurate knowledge of the span fiber types in a link may be advantageous for optimizing transmissions over the link. For example, knowledge of the fiber type(s) of span 110 may be used to select an optimal launch power for the optical amplifier 114 in order to minimize the sum of linear and nonlinear noise in the fiber length 112.

Operations of the various components of the communications system 100, including the transmitter 104, the receiver 106, and the plurality of optical amplifiers in the link 102, may be controlled by a controller 108. For example, the controller 108 may provide instructions to the optical amplifier 114, as denoted by arrow 116, to provide a particular gain.

Although not explicitly illustrated, other elements may be present in the link 102, such as wavelength selective switches, optical multiplexers, optical de-multiplexers, optical filters, and the like.

Usually, the span fiber types that are present within a given link, such as the link 102, are known. However, a non-negligible percentage of spans within the link may be incorrectly identified as comprising different fiber types than the fiber types that are actually present in those spans. Alternatively or additionally, there may be some percentage of spans within the link that have unknown fiber types. When the fiber types in a link are misidentified or unknown, this may lead to an offset in provisioned launch power with respect to optimal launch power, which may reduce the signal-to-noise ratio (SNR) of received signals, thereby reducing network capacity. In another example, when the fiber types in the link are misidentified or unknown, the uncertainty of link budgeting may increase, which may require an increased margin network planning to address this uncertainty, thereby reducing network capacity. It may be difficult or impossible to directly identify the fiber types that exist within all the spans of a given link, as some portions of the link may be remotely located or inaccessible. Accordingly, technology that is capable of remotely identifying the fiber types that exist within a link may be of interest.

Link accumulated optical noise consists of linear and nonlinear contributions. The linear noise results from optical amplification, that is, amplified spontaneous emission (ASE) noise. An important nonlinear noise results from the Kerr effect in optical fiber. The Kerr effect is a third-order nonlinearity, in which three fields (separated in time, or separated in frequency) interact to produce a fourth field. The Kerr effect is referred to as intra-channel Kerr nonlinear noise in cases where the three interacting fields are within a channel and the resulting fourth field is also within that same channel. The Kerr effect is referred to as inter-channel Kerr nonlinear noise in cases where the three interacting fields are between different channels (that is, one interacting field is from one channel and two interacting fields are from another channel, or each interacting field is from a different channel) and in cases where the three interacting fields are from one channel and the resulting fourth field is in a different channel.

The ratio of linear and nonlinear noise depends on the power of optical signals during transmission. At small launch power, the link accumulated noise is dominated by linear noise due to low optical signal-to-noise ratio (OSNR). At high launch power, the fiber nonlinearities can dominate.

An optical receiver, such as the receiver 106 in FIG. 1, may be configured to isolate a noise component of a received signal. Isolation of the noise component may be achieved from the received symbols and estimated transmitted symbols, or from the received symbols and training symbols. Isolation of the noise component assumes that nonlinear noise is a small perturbation of the otherwise linear transmit signal:

$$A' = A + \Delta A \qquad (1)$$

where A is the transmitted signal, A' is the received signal, and $\Delta A$ is the nonlinear noise component of the received signal. A, A', and $\Delta A$ are functions of time t and distance z. Other noise, including linear noise and transceiver internal noise, is ignored in equation (1).

Based on perturbation theory, the nonlinear Schrödinger equation can be expressed as $$\frac{\partial \Delta A}{\partial z} - \frac{i\beta_2}{2}\frac{\partial^2 \Delta A}{\partial t^2} + \frac{\alpha}{2}\Delta A = -i\gamma |A|^2 A \qquad (2)$$

where $\beta_2$ is a second order dispersion coefficient, $\alpha$ is an attenuation coefficient of the optical power, and $\gamma$ is the fiber nonlinear coefficient.

With single-polarization signals, the intra-channel Kerr nonlinear noise component indexed by k may be represented approximately as $$\Delta A[k] = \Sigma_{m,n} C[m,n] A[k+m] A[k+n] A^*[k+m+n] \qquad (3)$$

where A[k] is the transmitted symbol indexed by k, and the asterisk (*) denotes conjugation. C[m, n] denotes a matrix of coefficients, also referred to as a C-matrix, which will be discussed in more detail below. A[k] is a sampled version of A in equations (1) and (2).

As mentioned above, in the Kerr effect, three fields (separated in time, or separated in frequency) interact to produce a fourth field. Thus equation (3) involves a triplet of symbols: a symbol indexed by k+m, a symbol indexed by k+n, and a symbol indexed by k+m+n. The triplet is represented by the shorthand (k,m,n,m+n).

In the time domain, the three interacting fields may be represented with $A[k] = A(k \cdot \Delta t)$ where $\Delta t$ is the sample duration, and the corresponding C-matrix may be in the time domain.

In the frequency domain, the three interacting fields may be represented with $A[k] = \tilde{A}(k \cdot \Delta f)$, where $\tilde{A}(f)$ is the Fourier transform of A(t) and $\Delta f$ is the frequency spacing, and the corresponding C-matrix may be in the frequency domain.

In the symbol domain, the three interacting fields may be represented with with $A[k] = A(k \cdot T)$ where T denotes the symbol duration, and the corresponding C-matrix may be in the symbol domain.

The indices m and n can take on negative values, zero values and positive values. For example, the sequence A[−2], A[−1], A[0], A[1], A[2] represents five consecutively transmitted symbols. The contribution of the nonlinear intra-channel interaction between A[−1], A[1], and A[2] to the intra-channel Kerr nonlinear noise, AΔ[0], is given by C[−1,2]A[−1]A[2]A*[1].

The coefficients of the C-matrix C[m, n], generally referred to as C-coefficients, characterize how the Kerr effect is manifested in the channel over which the symbols have been transmitted and received. That is, the C-matrix C[m, n] characterizes the fourth field that is produced by the Kerr effect.

Assuming the power of symbols is normalized, the C-matrix C[m,n] can be estimated by evaluating the cross-correlation between the intra-channel noise component and the field of the (k,m,n,m+n) triplet.

The C-matrix C[m, n] and can be evaluated as follows:

$$C[m,n]=E[\Delta A[k] \cdot A^*[k+m] \cdot A^*[k+n] \cdot A[k+m+n]] \qquad (4)$$

where E is an expectation, which is a weighted average. In equations (3) and (4), the transmitted symbols can be replaced by the received symbols.

The above describes in general terms how a C-matrix may be computed based on a single-polarization signal received at a receiver. U.S. Ser. No. 15/461,718 to Reimer et al., filed on Mar. 17, 2017 and incorporated by reference herein, provides a more detailed explanation of C-matrix calculations for dual-polarization signals. A coherent modem may be configured to compute C-matrices based on received symbols and estimated transmitted symbols, or based on received symbols and training symbols, as described by Reimer et al.

The C-coefficients of a C-matrix characterize how the Kerr effect is manifested in a given link between a transmitter and a receiver. Manifestation of the Kerr effect depends on the properties of the link. Accordingly, a single C-matrix calculated for a given link comprising one or more spans may depend on the parameters of each span in the link, including the length of each span, the fiber type of each span, the chromatic dispersion (CD) coefficient of each span, the attenuation loss coefficient of each span, the nonlinear coefficient of each span, and the launch power of each span. For a theoretical link consisting of only one span, a single C-matrix could be used to infer one or more parameters of the span, such as the fiber type. Additional parameters, such as span length and launch power, may assist in the estimation of fiber type, while additional C-matrices may improve the accuracy of the estimate. For a link that comprises more than one span, a single C-matrix may be insufficient to infer the parameters of each span within the link.

CD causes an input signal to broaden as it travels down a length of fiber. This broadening is the result of different velocities experienced by different spectral components of the signal. Different fiber types may have different CD characteristics. A technique known as dispersion compensation may be used to compensate for the net CD in a given link. Dispersion compensation is achieved by providing a negative dispersion to oppose the positive dispersion in the link. Dispersion compensation may be performed using some combination of pre-compensation at the transmitter and post-compensation at the receiver. The sum of the CD pre-compensation and post-compensation should always be substantially equal to the net CD of the link but with the opposite sign, so as to substantially compensate for the net CD of the link.

The impulse response will reach a minimum width at a particular location within the link. This location is dependent on what proportion of the compensation is performed at the transmitter (i.e., the percentage of pre-compensation), relative to what proportion of the compensation is performed in the receiver (i.e., the percentage of post-compensation). For example, if 90% of the compensation is performed at the transmitter, the narrowest impulse response along the link may occur close the receiver, after which the pulse may briefly begin to increase in width, and then the remaining 10% of the compensation may be performed at the receiver to narrow the width. Alternatively, if 10% of the compensation is performed at the transmitter, the narrowest impulse response along the link may occur close the transmitter, after which the pulse may increase in width until reaching the receiver, at which point the remaining 90% of the compensation may be performed.

The location of the narrowest impulse response corresponds to the location of the lowest peak-to-average power ratio (PAPR). This is also the location where the nonlinear noise contribution is the lowest. Thus, the choice of the relative percentages of pre-compensation and post-compensation may determine the location of lowest nonlinearity in the link. Generally, other locations in the link may experience a significantly higher, and relatively consistent, amount of nonlinearity. The extent of the reduction in the nonlinear noise contribution at the location of the narrowest impulse response may be dependent on the fiber parameters at that location. In other words, for a given link in an optical communications system, there is a relationship between the link parameters and the C-matrices (or other related results, such as nonlinear noise variance) that are calculated at various CD pre-compensation/post-compensation values. This relationship may be exploited in order to infer unknown link parameters.

For example, a plurality of C-matrices may be calculated at a corresponding plurality of CD pre-compensation values. Each different CD pre-compensation value is accompanied by a complementary CD post-compensation value at the receiver, such that the total CD compensation is always equivalent to the CD of the link. As described above, each different CD pre-compensation corresponds to a particular location in the link of the narrowest impulse response. By repeating signal measurements over a range of CD pre-compensation values, one is effectively "scanning the link" at a plurality of locations, the results of which may be used to obtain additional information about the fiber parameters. Specifically, for each different CD pre-compensation value, a new C-matrix may be calculated by isolating the noise component of a transmitted signal, as described previously. The relative changes between the C-matrices associated with the plurality of CD pre-compensation values may be used to identify one or more parameters of the fibers in the link, including the fiber types present at the plurality of locations that correspond to the plurality of CD pre-compensation values.

In practice, it may be difficult or impossible to derive fiber parameters from C-matrices using analytical methods, empirical methods, or brute force search methods, since the number of parameter combinations may become prohibitively large as the number of spans in a link increases. A machine learning algorithm, such as a trained artificial neural network (ANN), may be used to translate a plurality of C-matrices into fiber parameters. An example method for training one or more ANNs is described with respect to FIG. 4.

Figure 2:
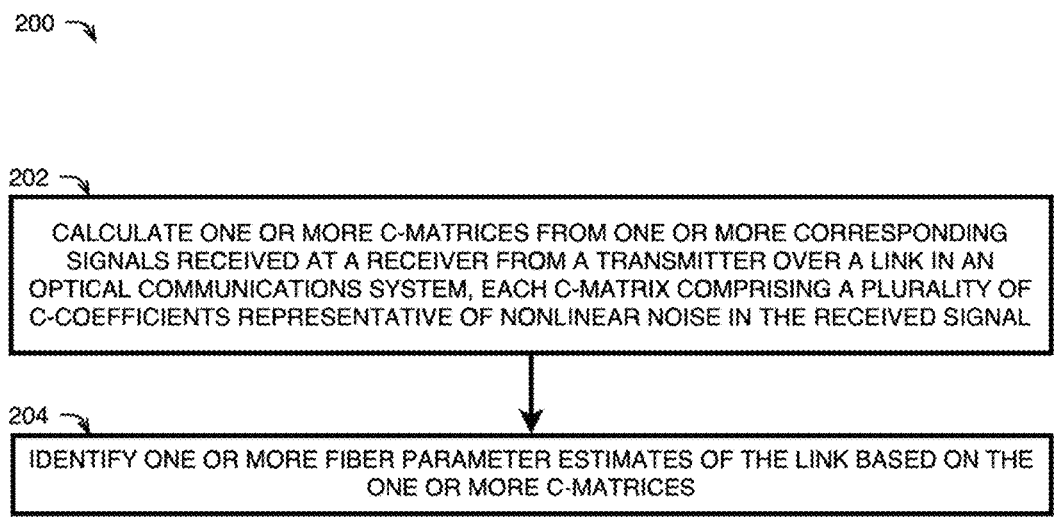
FIGS. 2 and 3 illustrate example methods for fiber parameter identification.
Figure 3:
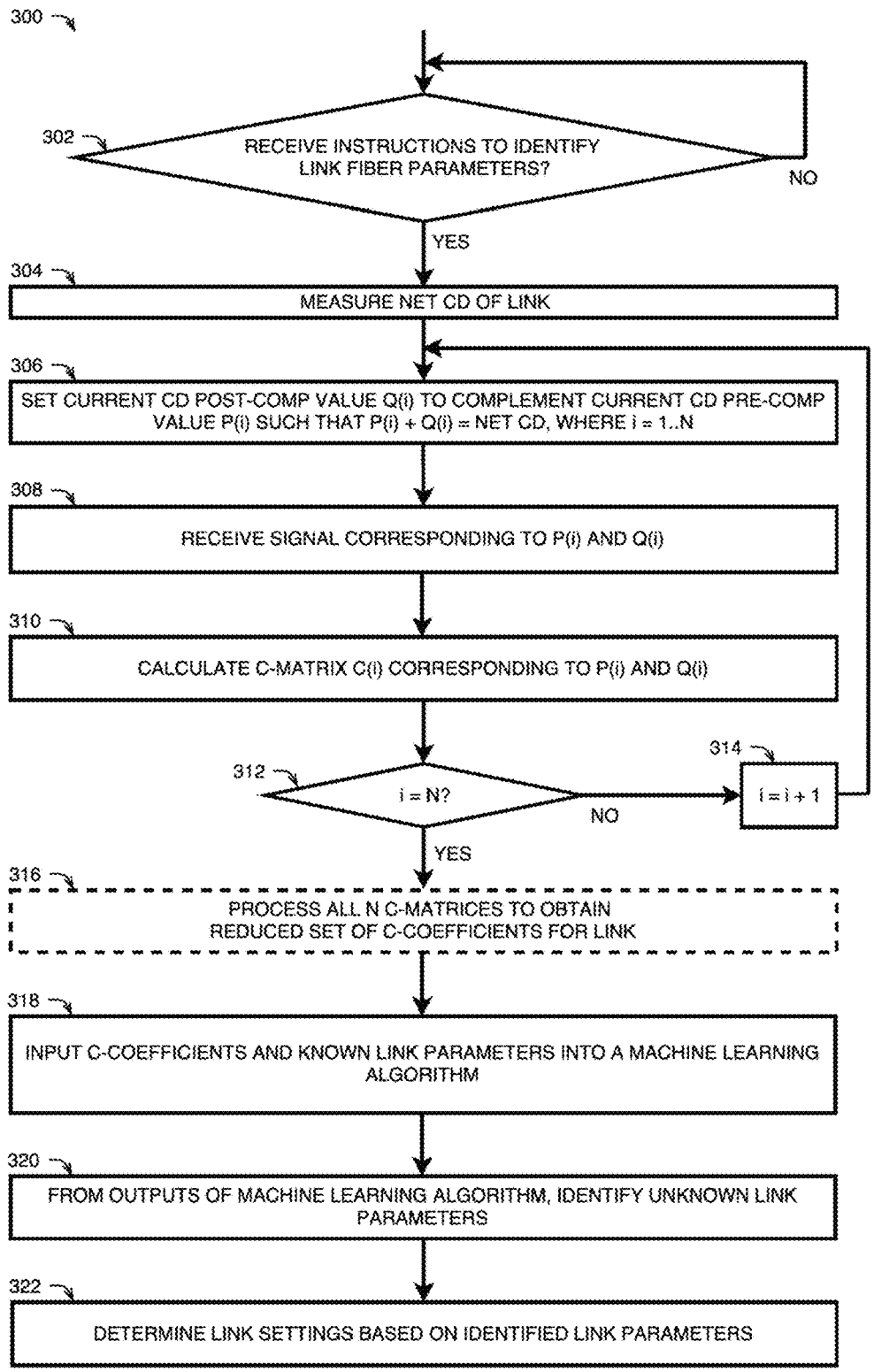

FIGS. 2 and 3 illustrate example methods 200 and 300, respectively, for fiber parameter identification, the methods to be performed in an optical communications system, such as the system 100.

Aspects of the fiber parameter identification methods 200 and 300 may be performed at a receiver, such as the receiver 106. In some examples, portions of the methods 200 and 300 may be performed at a controller of the communications system, such as the controller 108. The methods 200 and 300 may be performed during an out-of-service period, during which no other data transmissions are taking place between the transmitter and the receiver. The methods 200 and 300 may be initiated manually, for example, by a network operator, or automatically in response to a network event. For example, the methods 200 and 300 may be initiated when a connection is routed to a new path in which some of the spans are unknown. In some examples, the methods 200 and 300 may be performed once following the installation of a link.

Referring to the method 200 illustrated in FIG. 2, at 202, one or more C-matrices may be calculated from one or more corresponding signals received at a receiver from a transmitter over a link in an optical communications system. Each C-matrix may comprise a plurality of C-coefficients representative of nonlinear noise in the received signal.

At 204, one or more fiber parameter estimates of the link may be identified based on the one or more C-matrices calculated at 202. Examples of the fiber parameter estimates include, but are not limited to, fiber type estimates, nonlinear coefficient estimates, and dispersion coefficient estimates. The fiber parameter estimates identified at 204 may subsequently be used to control a state of the optical communications system to achieve an objective, such as improved network performance.

As will be described in more detail with respect to the method 300, a combination of CD pre-compensation applied at the transmitter and CD post-compensation applied at the receiver may substantially compensate for a net CD of the link. Where a plurality of C-matrices are calculated at 202, each C-matrix may be calculated from a corresponding received signal, and a different amount of CD post-compensation may be applied at the receiver for each received signal.

As will be described in more detail with respect to the FIG. 4, the identification of fiber parameter estimates at 204 may include applying a machine learning algorithm, such as one or more trained ANNs, to the C-coefficients and to one or more known parameters of the link such as the net CD of the link, a length of the link, and a launch power of each span in the link.

Referring now to the method 300 illustrated in FIG. 3, at 302, the receiver may receive instructions to identify one or more parameters of the fibers in a link. For example, the controller 108 may send instructions to the transmitter 104 and to the receiver 106 to begin the fiber parameter identification method 300. The instructions received by the receiver at 302 may include an indication of parameters to be used in the method 300, such as a number and distribution of CD post-compensation values to be used for the plurality of C-matrix calculations. Similarly, the transmitter may receive instructions indicating the corresponding number and distribution of CD pre-compensation values to be used. The CD pre-compensation and CD post-compensation values may be denoted as $P(i)$ and $Q(i)$, respectively, for $i=1 \ldots N$, where N is a positive integer. Each pair of CD pre-compensation and CD post-compensation values, $(P(i), Q(i))$, may have a sum that is substantially equal to the net CD of the link but with the opposite sign, so as to substantially compensate for the net CD of the link. For ease of explanation, the CD pre-compensation values $P(i)$ and the CD post-compensation values $Q(i)$ may be referred to in units of percentage of the net CD of the link, such that $P(i)+Q(i)=100\%$.

As shown at 304, the net CD of the link may be measured at the receiver in response to receiving the instructions at 302. Alternatively, the net CD may be measured or calculated at some other time prior to beginning the method 300.

One may consider a simple example in which N different C-matrices, denoted $C(i)$ for $i=1 \ldots N$, are to be calculated for N=5 different CD pre-compensation values that are evenly distributed between 0% and 100% in ascending order. In this example, five C-matrices would be computed for five CD pre-compensation/post-compensation pairs as illustrated in Table 1 below.

TABLE 1

| C-matrix C(i) | CD pre-compensation P(i) | CD post-compensation Q(i) |
| --- | --- | --- |
| C(1) | P(1) = 0% | Q(1) = 100% |
| C(2) | P(2) = 25% | Q(2) = 75% |
| C(3) | P(3) = 50% | Q(3) = 50% |
| C(4) | P(4) = 75% | Q(4) = 25% |
| C(5) | P(5) = 100% | Q(5) = 0% |

The number and distribution of CD pre-compensation/post-compensation values may be determined based on known, expected or estimated parameters of a given link, such as a length of the link, a number of spans within the link, lengths of the individual spans, and the like. Generally, as the number of spans in a link increases, the more individual C-matrix calculations may be necessary to obtain accurate fiber parameter identification according to the method 200. Although the above example uses a set of five evenly-distributed CD pre-compensation percentages which are implemented in ascending order, many other distributions and orders are possible. In some examples, the number N of $(P(i), Q(i))$ pairs may be at least as high as the number of spans known to be in the link. For example, where a link is known to consist of ten spans, a decision may be made to calculate C matrices for N=20 different $(P(i), Q(i))$ pairs. In another example, a single C-matrix comprising thousands of C-coefficients might already contain enough information to enable a relatively accurate estimation of all span parameters.

At 306, the receiver may set the first CD post-compensation value $Q(1)$ to a value that complements the first CD pre-compensation value $P(1)$ that is expected to be used at the transmitter for the first transmitted signal.

At 308, the receiver may receive the signal associated with the first CD pre-compensation value $P(1)$ and the first CD post-compensation value $Q(1)$. In the example above, these values would be $P(1)=0\%$ and $Q(1)=100\%$.

At 310, the receiver may calculate a first C-matrix $C(1)$ from the signal received at 308. The C-matrix $C(1)$ may be calculated, as described previously, by isolating the nonlinear noise component of the received signal.

At 312, the receiver may determine whether one or more additional C-matrices are to be calculated at one or more additional CD pre-compensation values. For example, the receiver may check whether the current value of index i is equal to the total number of C-matrices N to be calculated. In the example above, the receiver may determine that the current value of index i is 1, which is not equal to N(=5), and the receiver may increment the value of index i by 1, as denoted at 314. At this point, the receiver may return to step 306 and may set the current CD post-compensation value Q(2) to a value that complements the second CD pre-compensation value P(2) that is expected to be used at the transmitter for the second transmitted signal. In the example above, these values would be P(2)=25% and Q(2)=75%. The receiver may then receive the second signal at 308. At 210, the receiver may calculate a second C-matrix C(2) that corresponds to the CD pre-compensation value P(2) and the CD post-compensation value Q(2). In this manner, the receiver may calculate a plurality of C-matrices, where each C-matrix corresponds to a different (P(i),Q(i)) pair. Although not explicitly illustrated in the method 300, signal properties other than C-coefficients may be measured or calculated at the receiver for each CD pre-compensation/post-compensation pair, including noise variance, noise correlations, receive signal correlations, and the like. It should also be noted that other signal properties may be used to extract link information.

Once it is determined at 312 that no additional C-matrices are to be calculated (i.e., that index i=N), the method may proceed to 316, at which point the N C-matrices that have been calculated for the link may optionally be processed to obtain a reduced set of C-coefficients. In one example, the N C-matrices may undergo a process of Principal Component Analysis (PCA), which removes redundancies so as to provide a set consisting of significantly fewer C-coefficients, without a significant loss of information. The reduced set of C-coefficients may provide a more manageable data set to be used in the identification of fiber parameters.

At 318, the C-coefficients from the C-matrices calculated at 310 (or from the reduced set determined at 316) may be inputted into a machine learning algorithm together with other known link parameters, such as the net CD measured at 304, the link length, and the launch power of each span in the link.

At 320, outputs from the machine learning algorithm may be used to identify one or more unknown link parameters. Examples of link parameters that may be identified from the outputs of the machine learning algorithm include respective fiber types of the plurality of spans or sections in the link, respective CD coefficients of the plurality of spans or sections in the link, respective effective fiber core areas of the plurality of spans or sections in the link, respective attenuations of the plurality of spans or sections in the link, respective effective nonlinear coefficients of the plurality of spans or sections in the link, and the like. The machine learning algorithm may also be used to identify other parameters of the link, such as the respective launch powers of the plurality of spans or sections in the link or the respective fiber lengths of the plurality of spans or sections in the link. Each parameter identified at 320 may represent an estimate of the true parameter. Accordingly, there may be some amount of uncertainty associated with each identified parameter. This uncertainty, or error estimate, may depend on a variety of factors, such as the manner of calculating the C-matrices at 310, the manner of obtaining the reduced set of C-coefficients at 316, and the nature of the machine learning algorithm employed at 318 and 320, including the nature of any training methods used for the machine learning.

In one example, the machine learning algorithm employed at 318 and 320 may comprise a plurality of trained ANNs, where each ANN models a different span of the link. In another example, a single ANN could be used to model multiple spans. Examples of ANNs include feedforward ANNs, convolutional ANNs, residual ANNs, etc. ANN training is described with respect to FIG. 4.

As an alternative to machine learning, a look-up table could be used to translate measured signal properties, such as the C-coefficients, into link parameters.

At 322, link settings may be determined based on the parameter estimates identified at 320. For example, the parameters may be used to determine an optimal gain for each optical amplifier in order to reduce noise and to maximize the SNR of transmissions over the link. The link settings determined at 322 may then be applied to one or more elements of the communications network, such as the transmitter and the receiver of the link, any optical amplifiers in the link, any wavelength selective switches in the link, and the like. The link settings may be applied by the controller in the form of a control scheme which establishes a state of the communications network. The state of the network may be controlled in order to achieve specific objectives, such as performance improvements, such as a reduction in the margins required in network planning and an increase in overall network capacity.

Portions of the methods 200 and 300 may be performed using some combination of the transmitter and the receiver of a given link, such as the transmitter 104 and the receiver 106, and a controller, such as the controller 108. Aspects of the methods 200 and 300 may be implemented using some combination of firmware, software, and/or hardware, including application-specific integrated circuits (ASICs), located in the different elements of the communications system. Instructions for implementing each aspect of the methods 200 and 300 may be stored on one or more computer-readable media for execution by one or more processors of the respective elements used to implement the methods 200 and 300. In practice, it may be of interest to limit the amount of communications between the receiver and the controller. A given communications network may comprise thousands of receivers, so reducing communications between the receivers and the controller may prevent the network from becoming bogged down.

In one example, the transmitter and the receiver may each comprise respective firmware storing computer-executable instructions. The transmitter may be configured, in response to instructions to begin a method of fiber parameter identification, to send a series of impulse responses over the link at a plurality of different CD pre-compensation values. The receiver may be configured, in response to instructions to begin the method of fiber parameter identification, to calculate a C-matrix upon receipt of each impulse response over the link (denoted at 310), and to adjust the CD post-compensation value to complement the CD pre-compensation value used at the transmitter. The receiver may further be configured to calculate the reduced set R of C-coefficients, as denoted at 316. The receiver may then perform the machine learning operations at 318 and 320 in order to convert the reduced set R of C-coefficients into a series of fiber type estimates corresponding to respective locations in the link. The receiver may send the fiber type estimates (optionally including corresponding error estimates) as a function of location to the controller. Following receipt of this information from the receiver, the controller may combine it with other information about the link, such as information measured by other elements in the communications system. In this manner, the fiber type estimates obtained from the receiver for the given link may be used to improve the accuracy of the information possessed by the controller about that link. For example, estimates obtained from ANNs may be combined with those obtained from other estimation methods, such as inline measurement instruments, in order to improve accuracy. Based on this enhanced information, the controller may determine how one or more elements of the communications system should operate in order to improve performance. For example, the controller may send instructions to one or more optical amplifiers in the link to increase or decrease their respective gains, based on the enhanced information about the fiber types in their respective spans.

In a meshed optical network, a given span may be shared by more than one link. Accordingly, the methods 200 and 300 may be applied in different links to obtain multiple parameter estimates for a shared span. These estimates may be combined with each other and, optionally, with estimates obtain from other estimation methods to improve the overall estimate for the span. For example, in a network where a first link and a second link share a common span, a controller device of the network may be configured to combine a first fiber parameter estimate identified by a first electronic device and associated with the common span, with a second fiber parameter estimate identified by the second electronic device and associated with the common span, thereby generating an improved estimate of that fiber parameter for the common span. Alternatively or additionally, a fiber parameter estimate may be improved by configuring the controller device to combine one or more fiber parameters estimates identified by one or more electronic devices in the network, according to the methods described herein, with fiber parameter measurements or estimates obtained by other means. For example, span net dispersion may be estimated by measuring propagation delay of optical pulse sources at two wavelengths. The sources may be opportunistically borrowed from their original optical time-domain reflectometer (OTDR) purpose. Alternatively or additionally, the other measurements used to improve fiber parameter estimates may comprise archived estimates from earlier measurement campaigns. In another example, independent per-span estimates of fiber type, dispersion or other fiber parameters may be obtained using electrostriction, as described by Shiner et al. in U.S. Ser. No. 15/828,497 filed on Dec. 1, 2017.

One or more of the transmitter and the receiver referred to in the above examples may comprise a coherent transceiver or modem. The ability to calculate a C-matrix from a received signal may be a built-in function of a coherent modem. Accordingly, in some examples, no additional hardware or costly equipment may be needed to provide a coherent modem with the functionality to sweep through a series of CD pre-compensation/post-compensation pairs in order to extract link information.

Figure 4:
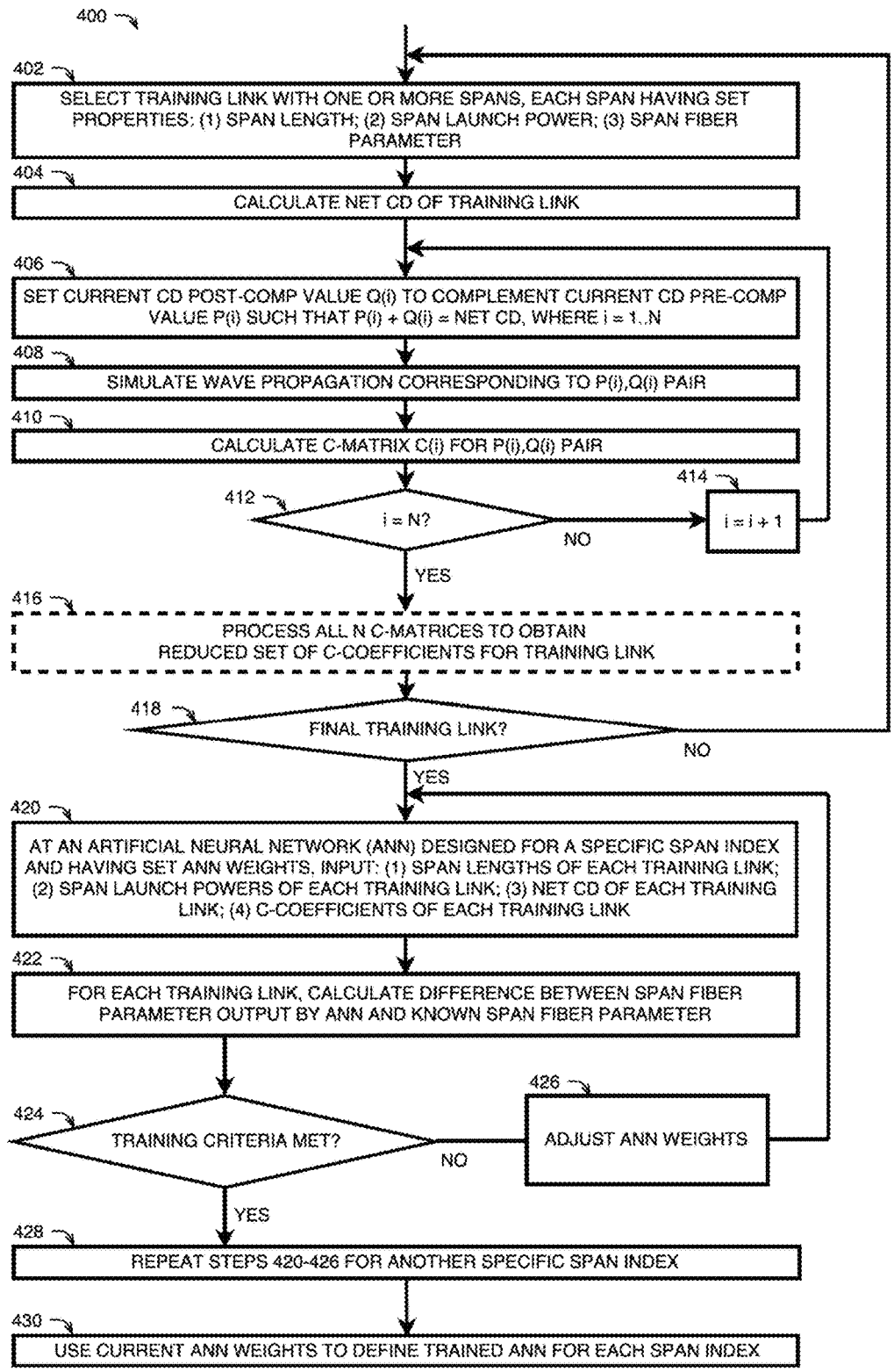
FIG. 4 illustrates an example method for artificial neural network (ANN) training to be used in conjunction with the methods for fiber parameter identification illustrated in FIGS. 2 and 3.

FIG. 4 illustrates an example method for ANN training 400 to be used in conjunction with the fiber parameter identification methods 200 and 300.

The ANN training method 400 comprises a series of computer-executable instructions, stored on a computer-readable medium, which may be executed by a processor of an electronic device. The ANN training method 400 may be performed offline using either simulation data or real data collected from known links.

The ANN training method 400 begins at 402 by selecting a training link comprising one or more spans. The selected training link may be a simulated link or real link. In either case, a set of properties may be defined for each span, including span length, span launch power, and at least one span fiber parameter. Examples of span fiber parameters include fiber type(s), effective fiber core area, attenuation, effective nonlinear coefficient, and the like. In general, training links may be selected to have properties that are realistic for the types of links to which the ANNs are to be applied. There may be significant differences in link properties according to location (i.e., region, country, continent, etc.) and also according to application (i.e., metro networks, regional networks, long-haul networks, submarine networks, etc.). Accordingly, it may be of interest to have a variety of ANN models that have been trained for different circumstances. The training link selected at 402 may be used to train one or more ANNs to be used in the fiber identification methods 200 and 300.

At 404, the net CD may be calculated for the training link selected at 402.

At 406, a current pair of CD pre-compensation and CD post-compensation values, denoted P(i) and Q(i) respectively, may be set for the training link, where i=1 . . . N, where N is a positive integer. As described with respect to FIG. 3, the CD pre-compensation values P(i) and the CD post-compensation values Q(i) may be referred to in units of percentage of the net CD of the link, such that P(i)+Q(i)=100%.

At 408, propagation of a waveform may be simulated over the training link selected at 402 for (P(i),Q(i)) pair defined at 406.

At 410, a C-matrix C(i) may be calculated based on the waveform propagation simulated at 408, which corresponds to the current (P(i),Q(i)) pair.

At 412, a determination may be made whether one or more additional C-matrices are to be calculated for one or more additional (P(i),Q(i)) pairs. Where it is determined that the index i is not yet equal to the number N of C-matrices that are to be calculated, the index i may be incremented by 1, as denoted at 414. At this point, the method may set a new (P(i),Q(i)) pair at 406, simulate a new waveform propagation at 408, and calculate a new C-matrix at 410. In this manner, a plurality of C-matrices may be calculated, where each C-matrix corresponds to a different (P(i),Q(i)) pair. In a variation of the method 400 (not shown), the series of waveform propagation results may be stored in memory, and the plurality of C-matrices may only be calculated after all waveform propagations in the series have been simulated. In one example, the saved propagation results might be used for some other application or to re-train the machine learning algorithm. As an alternative to waveform propagation simulations, C-matrices may be calculated based on a first order perturbation model.

Once it is determined at 412 that no additional C-matrices are to be calculated (i.e., that index i=N), the method may optionally proceed to 416, at which point the N C-matrices that have been calculated for the selected training link may be processed, for example using PCA, to obtain a reduced set of C-coefficients.

In order to improve the accuracy of the trained ANNs, many different training links may be used. For example, if it is determined at 418 that the current training link is not the final link to be used for training, the method may proceed back to step 402, and a new training link may be selected which has at least some properties that differ from the previous training link. The net CD of the new training link may be calculated at 404, a plurality of C-matrices may be calculated for the new training link corresponding to a plurality of (P(i),Q(i)) pairs, according to steps 406 through 414, and a reduced set of C-coefficients may optionally be calculated for the new training link at 416.

Once it is determined at 418 that the current training link is the final training link, the method may proceed to 420. Here, the C-coefficients from the C-matrices calculated at 410 (or from the reduced sets determined at 416) may now be used to train one or more ANNs. These trained ANNs may subsequently be used to identify fiber parameters according to the methods 200 and 300. In one example, a separate ANN may be used to model each span of a link. In another example, a single ANN may be used to model multiple spans. Various ANN topologies are contemplated, such as feedforward ANNs, convolutional ANNs, residual ANNs, and the like. Each ANN may be defined as comprising a specific number of hidden layers, and a specific number of nodes in each layer.

At 420, at an ANN designed for a specific span index, the following properties associated with the training links may be input: (1) span lengths of each training link; (2) span launch powers of each training link; (3) net CD of each training link; and (4) C-coefficients of each training link. It may be further advantageous to design a separate per-span-index ANN for each span count. The ANN may be configured to output a value that is representative of one or more types of fiber that are present in the span index. In one example, the ANN may output a value that is correlated with a particular fiber type (e.g., 1=NDSF; 2=LEAF; 3=TERA, etc.). In another example, the ANN may output a nonlinear coefficient corresponding to one or more fiber types (e.g., 34.51 dB=NDSF; 28.01 dB=LEAF; 29.76 dB=TERA, etc.).

At 422, for each training link, the difference between the value output by the ANN and the known value may be calculated. At 424, it may be determined whether certain training criteria have been met for the ANN. In one example, the training criteria may be met when the average or sum of the differences calculated for each training link at 422 is less than some threshold value. That is, the average of the differences (or the sum of the differences) may be compared to a threshold value. If the average (or sum) is determined to exceed the threshold value, it may be determined that the training criteria have not yet been met, and the method may proceed to 426. Here, the weights used in the ANN may be adjusted in a manner that is expected to reduce the average (or sum) of the differences calculated at 422. In one example, the ANN weight adjustment may be performed using scaled conjugate gradient backpropagation. Following adjustment of the ANN weights, properties associated with the training links may again be inputted to the ANN at 420, and the difference between the ANN output and a known value of the span may again be calculated for each training link at 422. In this manner, the ANN is trained in a series of iterations, in which the ANN weights are incrementally adjusted until training criteria are met at 424. The determination of whether or not the training criteria have been met at 424 may alternatively or additionally depend the number of ANN weight adjustments that have already been performed at 426 (i.e., the number of iterations).

Once it is determined at 424 that the training criteria have been met, the method may proceed to step 428, at which point steps 420 through 426 may be repeated for another ANN that has been designed for another span index. In this manner, a plurality of ANNs may be trained to output span fiber parameters based on inputs associated with the training links. The ANN weights established during the ANN training method 400 may be used to define one or more trained ANNs, as shown at 430, that may subsequently be used in the fiber parameter identification methods 200 and 300.

Simulations were performed to test the accuracy of the methods 300 and 400. Three separate simulations were performed for links consisting of five spans, ten spans, and twenty spans, respectively. In each simulation, 400,000 different training links were used to train a plurality of ANNs, and the trained ANNs were then tested on 100,000 different testing links. In each simulation, spans were chosen from six possible fiber types: NDSF, TWC, LS, TWRS, LEAF, and TERA, where the distribution of fiber types across all 500,000 links was 35%, 15%, 15%, 15%, 10%, and 10%, respectively. In each simulation, the average span length across all 600,000 links was 80 km, with a variance of 20 km. In each simulation, the launch power of each span was provisioned at the optimal optical launch power, which minimizes the sum of linear and nonlinear noise, assuming the fiber type was NDSF plus a Gaussian variable with a standard deviation of 0.5 dB. In each simulation, a 56 Gbaud signal was used.

In each simulation, the C-matrices were calculated using a first order perturbation model, with each C-matrix consisting of 300 C-coefficients. For the five-span simulations, ten different CD pre-compensation/post-compensation pairs were used; for the ten-span simulations, twenty different CD pre-compensation/post-compensation pairs were used; and for the twenty-span simulations, forty different CD pre-compensation/post-compensation pairs were used. Accordingly, the five-span, ten-span, and twenty-span simulations resulted in totals of 3000, 6000, and 120000 C-coefficients, respectively. PCA was applied to each set of C-coefficients such that the reduced set for each one of the five-span, ten-span, and twenty-span simulations consisted of 200 C-coefficients.

Each ANN comprised three hidden layers, comprising 50, 40, and 30 nodes, respectively. Each ANN was trained to output an effective nonlinear coefficient for a specific span index in response to receipt of the following inputs: the real and imaginary parts of the 200 C-coefficients, the net CD of the link, the length of each span, and the launch power of each span. For each of the testing links, the effective nonlinear coefficient output by each ANN was compared to the actual effective nonlinear coefficient of the span modeled by that ANN, thereby providing an indication of the accuracy of the fiber parameter identification method 300.

Figure 5:
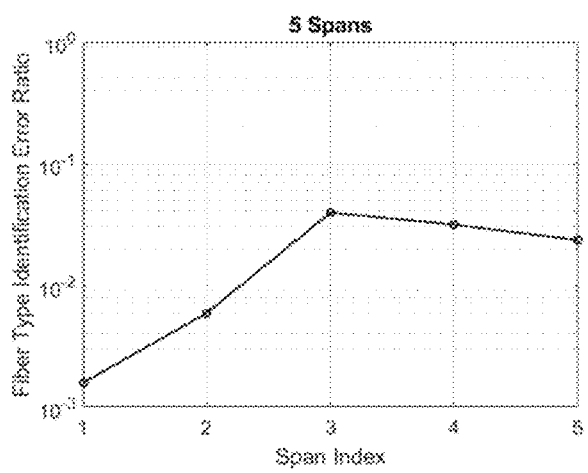
FIG. 5 illustrates example simulation results showing the probability of fiber parameter identification error, per span of a fiber link consisting of five spans, using the methods for fiber parameter identification and ANN training illustrated in FIGS. 3 and 4, respectively.
Figure 6:
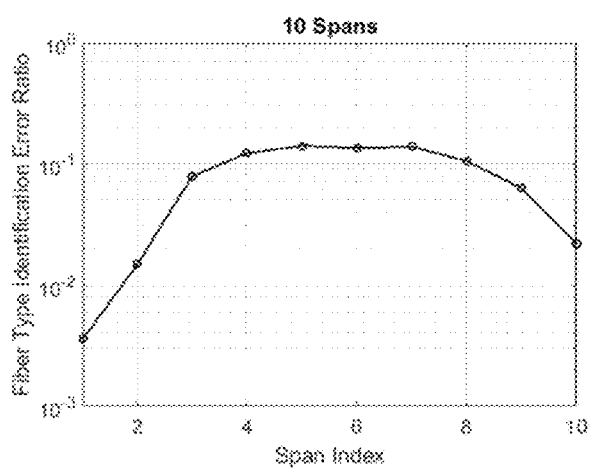
FIG. 6 illustrates example simulation results showing the probability of fiber parameter identification error, per span of a fiber link consisting of ten spans, using the methods for fiber parameter identification and ANN training illustrated in FIGS. 3 and 4, respectively.
Figure 7:
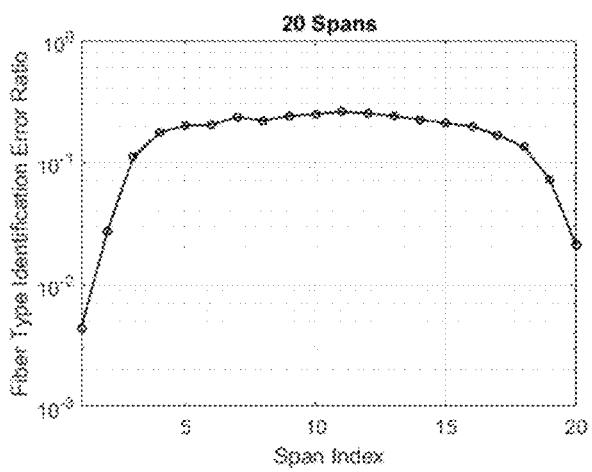
FIG. 7 illustrates example simulation results showing the probability of fiber parameter identification error, per span of a fiber link consisting of twenty spans, using the methods for fiber parameter identification and ANN training illustrated in FIGS. 3 and 4, respectively.

FIGS. 5, 6 and 7 illustrate example simulation results showing the probability of fiber parameter identification error, per span of a fiber link, using the fiber parameter identification method 300 and the ANN training method 400, for five-span links, ten-span links, and twenty-span links, respectively. In these simulations, C-matrices were calculated based on a first order perturbation model.

As is apparent in FIGS. 5, 6, and 7, the probability of incorrectly identifying fiber type is the lowest for spans that are close to the transmitter and to the receiver. The spans that are furthest from the transmitter and the receiver (i.e., the middle spans) have a greater probability of their fiber types being misidentified.

It is also apparent from a comparison of FIGS. 5, 6, and 7 that the accuracy of the fiber type identification may decrease as the number of spans in the link increases. For example, the middle span of the five-span link has an error ratio of 4%; the middles spans of the ten-span link have an error ratio of 15%; and the middle spans of the twenty-span link have an error ratio of 25%.

Figure 8:
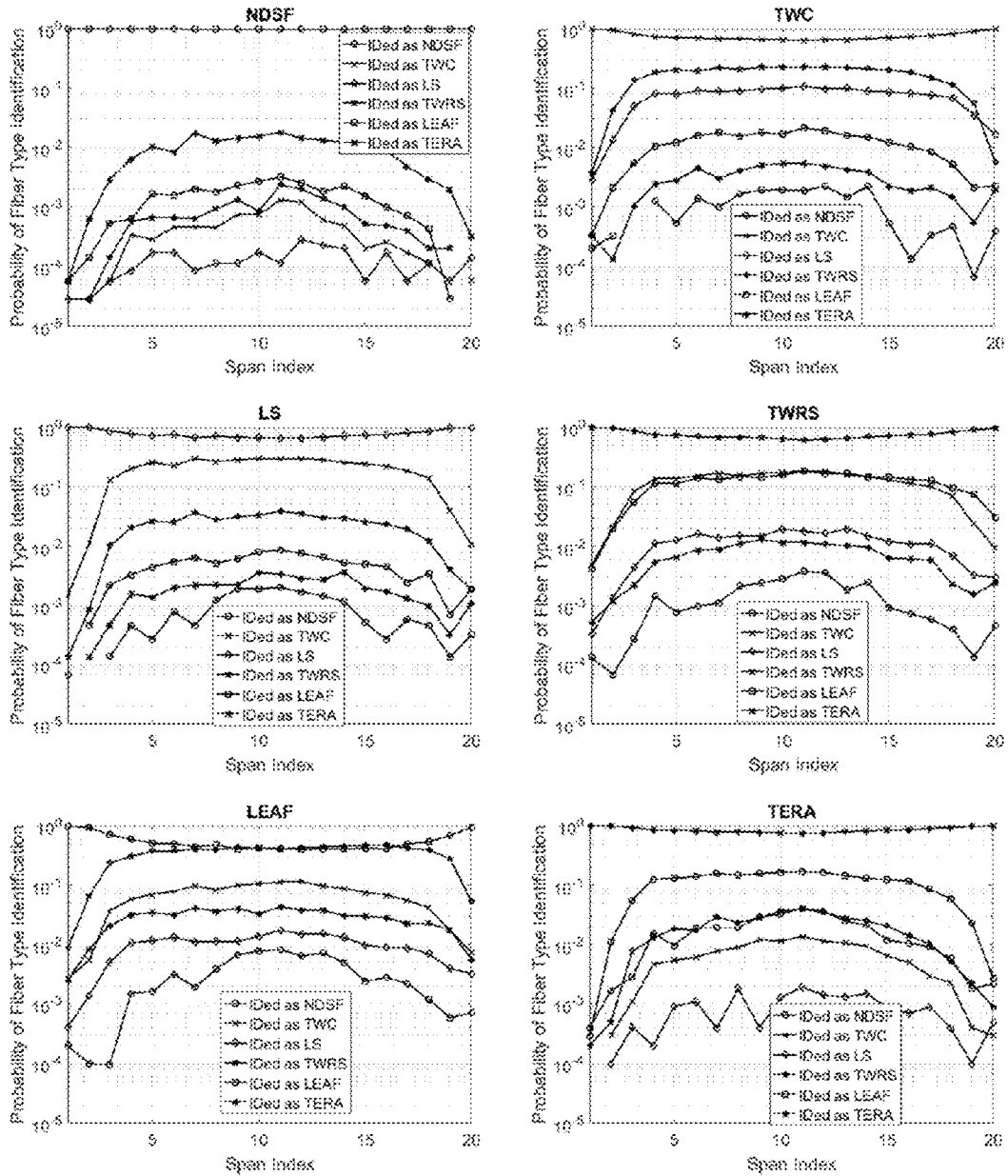
FIG. 8 illustrates example simulation results showing the probability of identifying each of six possible fiber types, per span of a fiber link consisting of twenty spans, using the methods for fiber parameter identification and ANN training illustrated in FIGS. 3 and 4, respectively, where the label at the top of each plot represents the actual fiber type.

FIG. 8 illustrates example simulation results showing the probability of identifying each of six possible fiber types, per span of a fiber link consisting of twenty spans, using the fiber parameter identification method 300 and the ANN training method 400, where the label at the top of each plot represents the actual fiber type. In these simulations, C-matrices were calculated based on a first order perturbation model.

These plots may be better understood by referring to the top left plot labelled "NDSF" as an example. The curve labelled as "IDed as NDSF" represents the probability, at each span in the link, that an NDSF fiber located in that span will correctly be identified as an NDSF fiber when using the method 300. As expected, this probability is very high—almost 100%. On the other hand, the curve labelled as "IDed as LS" represents the probability, at each span in the link, that an NDSF fiber located in that span will incorrectly be identified as an LS fiber when using the method 300. This probability is very low—less than 0.03% In other words, the likelihood of misidentifying an NDSF fiber as an LS fiber may be very low because the properties of these two fiber types are very different. On the other hand, if one refers to the bottom left plot labelled "LEAF", it is apparent that, over some of the middle spans, the curve labelled as "IDed as TWRS" actually overlaps with the curve labelled as "IDed as LEAF." For these middle spans, the probability that a LEAF fiber will correctly be identified as a LEAF fiber is about the same as the probability that a LEAF fiber will incorrectly be identified as a TWRS fiber. This is related to similar properties of these two fiber types, such as the similar CD coefficients and similar effective core areas.

The scope of the claims should not be limited by the details set forth in the examples, but should be given the broadest interpretation consistent with the description as a whole.

What is claimed is:

1. A method for fiber parameter identification in an optical communications system, the method comprising:
   calculating a plurality of C-matrices from a corresponding plurality of signals received at a receiver from a transmitter over a link in the optical communications system, each C-matrix comprising a plurality of C-coefficients representative of nonlinear noise in the received signal from which the C-matrix is calculated, wherein, for each of the plurality of received signals, a different amount of chromatic dispersion (CD) pre-compensation is applied at the transmitter, thereby minimizing signal nonlinearity at a different location in the link; and
   identifying, based on the plurality of C-matrices, one or more fiber parameter estimates corresponding to at least one of the different locations in the link.

2. The method as claimed in claim 1, wherein a combination of the CD pre-compensation applied at the transmitter and CD post-compensation applied at the receiver substantially compensates for a net CD of the link.

3. The method as claimed in claim 1, wherein the identifying comprises applying a machine learning algorithm to the C-coefficients and to one or more known parameters of the link.

4. The method as claimed in claim 3, wherein the one or more known parameters of the link comprise one or more of: a net CD of the link, a length of the link, and a launch power of each span in the link.

5. The method as claimed in claim 3, wherein the machine learning algorithm comprises one or more trained artificial neural networks (ANNs).

6. The method as claimed in claim 1, wherein the one or more fiber parameter estimates comprise estimates of at least one of one or more fiber types, one or more nonlinear coefficients, and one or more dispersion coefficients.

7. An electronic device configured for fiber parameter identification in an optical communications system, the device comprising:
   a processor; and
   a memory storing computer-executable instructions which, when executed by the processor, cause the device
      to calculate a plurality of C-matrices from a corresponding plurality of signals received at a receiver from a transmitter over a link in the optical communications system, each C-matrix comprising a plurality of C-coefficients representative of nonlinear noise in the received signal from which the C-matrix is calculated, wherein, for each of the plurality of received signals, a different amount of chromatic dispersion (CD) pre-compensation is applied at the transmitter, thereby minimizing signal nonlinearity at a different location in the link; and
      to identify, based on the plurality of C-matrices, one or more fiber parameter estimates corresponding to at least one of the different locations in the link.

8. The device as claimed in claim 7, wherein a combination of the CD pre-compensation applied at the transmitter and CD post-compensation applied at the receiver substantially compensates for a net CD of the link.

9. The device as claimed in claim 7, wherein the identifying comprises applying a machine learning algorithm to the C-coefficients and to one or more known parameters of the link.

10. The device as claimed in claim 9, wherein the one or more known parameters of the link comprise one or more of: a net CD chromatic dispersion (CD) of the link, a length of the link, and a launch power of each span in the link.

11. The device as claimed in claim 9, wherein the machine learning algorithm comprises one or more trained artificial neural networks (ANNs).

12. The device as claimed in claim 7, wherein the one or more fiber parameter estimates comprise estimates of at least one of one or more fiber types, one or more nonlinear coefficients, and one or more dispersion coefficients.

13. An optical communications network comprising:
   at least one link comprising one or more optically amplified spans; and
   at least one electronic device configured
      to calculate a plurality of C-matrices from a corresponding plurality of signals received over a particular link of the at least one link, wherein each C-matrix comprises a plurality of C-coefficients representative of nonlinear noise in the received signal from which the C-matrix is calculated, and wherein, for each of the plurality of received signals, a different amount of chromatic dispersion (CD) pre-compensation is applied at a transmitter of the particular link, thereby minimizing signal nonlinearity at a different location in the link; and
      to identify, based on the plurality of C-matrices, one or more fiber parameter estimates corresponding to at least one of the different locations in the particular link; and
   a controller device configured to use the identified fiber parameter estimates to control a state of the optical communications network to achieve an objective.

14. The optical communications network as claimed in claim 13, wherein a combination of the CD pre-compensation applied at a transmitter of the particular link and CD post-compensation applied at a receiver of the particular link substantially compensates for a net CD of the particular link.

15. The optical communications network as claimed in claim 13, wherein the at least one electronic device is configured to identify the one or more fiber parameter estimates by applying a machine learning algorithm to the C-coefficients and to one or more known parameters of the particular link.

16. The optical communications network as claimed in claim 15, wherein the machine learning algorithm comprises one or more trained artificial neural networks (ANNs).

17. The optical communications network as claimed in claim 16, wherein the at least one link comprises a first link and a second link, the first link and the second link sharing a common span, wherein the at least one electronic device comprises a first electronic device and a second electronic device, and wherein the controller device is configured to combine a first fiber parameter estimate identified by the first electronic device and associated with the common span, with a second fiber parameter estimate identified by the second electronic device and associated with the common span, to generate an improved fiber parameter estimate for the common span.

18. The optical communications network as claimed in claim 15, wherein the one or more known parameters of the particular link comprise one or more of: a net CD of the particular link, a length of the particular link, and a launch power of each span in the particular link.

19. The optical communications network as claimed in claim 13, wherein the controller device is configured to combine the one or more fiber parameter estimates identified by the at least one electronic device with fiber parameter measurements obtained by other means to generate one or more improved fiber parameter estimates for the particular link.

20. The optical communications network as claimed in claim 13, wherein the one or more fiber parameter estimates comprise estimates of at least one of one or more fiber types, one or more nonlinear coefficients, and one or more dispersion coefficients.

* * * * *